May 18, 1948.　　　　　M. M. STRUMIA　　　　　2,441,730
METHOD AND MEANS FOR PRESERVATION OF BLOOD PLASMA
AND THE LIKE BY FREEZING AND DRYING
Filed May 30, 1944　　　　2 Sheets-Sheet 1
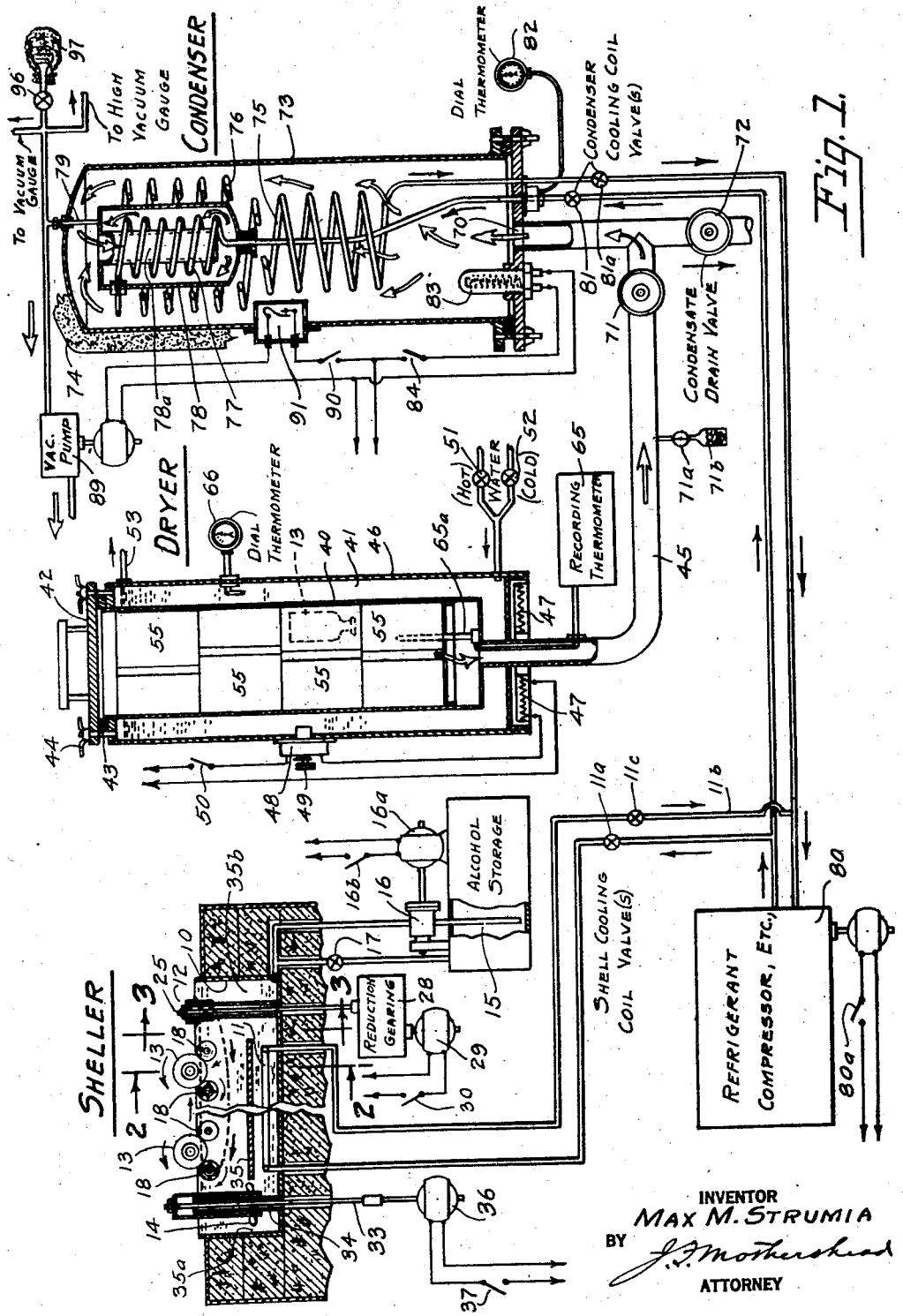

May 18, 1948.   M. M. STRUMIA   2,441,730
METHOD AND MEANS FOR PRESERVATION OF BLOOD PLASMA
AND THE LIKE BY FREEZING AND DRYING
Filed May 30, 1944   2 Sheets-Sheet 2

INVENTOR
MAX M. STRUMIA
BY
ATTORNEY

Patented May 18, 1948

2,441,730

UNITED STATES PATENT OFFICE 2,441,730

METHOD AND MEANS FOR PRESERVATION OF BLOOD PLASMA AND THE LIKE BY FREEZING AND DRYING

Max M. Strumia, Penn Valley, Pa., assignor to the United States of America as represented by the Director of the Office of Scientific Research and Development Application May 30, 1944, Serial No. 538,036

13 Claims. (Cl. 34—5)

1

This invention relates to method and means for preservation of blood plasma and other products by shell freezing and drying from the frozen state and aims generally to improve the same.

Shell freezing of such products in the final containers thereof, and drying of such products from the frozen state in such containers is the preferred method of preserving them, since this method provides for maximal preservation of all elements of the plasma, maximum solubility and minimal opportunity for contamination, and with standardization of the containers, facilitates regeneration of the product, as regeneration of plasma with a standard volume of 0.1 percent citric acid, for example.

Such shell freezing of plasma (taken as representative for the purpose of this description) has always heretofore been conducted at very low temperatures, minus 50 degrees C. and lower, because it has been deemed essential that the freezing be extremely rapid. It has been generally considered that if this were not the case, large ice crystals would form, interleaved by layers of protein and that the resulting concentrations of crystalloids would degenerate the proteins, i. e., that salt concentration would be increased and denature the proteins in the residual liquid. It has further been generally considered that such quick freezing at very low temperatures was necessary to avoid the formation of "mush ice" and balling-up of the product in the rotating container in which the shell was being frozen, thus interfering with the formation of a uniformly driable frozen shell.

The present invention aims to provide for conducting the freezing of the shell more quickly, at a higher temperature, with decrease of time and expense, and is based on the discovery that this can be accomplished without detriment to the shelling or to the product if a novel method of freezing is followed.

Further, in drying the material from the frozen state under high vacuum it has heretofore been the practice to draw off the water vapor from the top of the containers and drying chamber, and to then pass it downwardly into and through the condenser. This procedure was followed naturally enough, since in the early Bordas and d'Arsonval apparatus (consisting of two flasks connected at their tops by a T-tube and evacuated, one being the drying flask while the other was employed as the container cooled to minus 70 degrees C. to freeze out the water vapor) the material was placed in the bottom

2 of the drying flask in liquid condition and the heat loss due to initial rapid evaporation was relied upon to freeze the material, the apparatus remaining in the same relation during the subsequent drying by sublimation of water vapor from the frozen state, and since no reason had appeared to those skilled in the art for altering this general arrangement.

The present invention, however, discloses that by inverting the vapor flow, a step facilitated by pre-freezing of the material, and particularly by the shell freezing thereof, it is possible to effect a great economy of time and expense in the drying, and further, to obtain such efficient freezing out of the water vapor as to render it unnecessary to provide secondary traps for condensables between the main condenser and the vacuum pump.

By providing for downward withdrawal of the vapors from the drying chamber or evaporator, and preferably also from the shelled material itself, the drying time under otherwise identical conditions is reduced by nearly 20 or 25 percent.

By providing for upward flow of the vapors in the condenser the other condensing conditions being identical, the efficiency of freezing out of condensables is so increased that residual moisture in secondary traps is reduced to less than one one-hundredth ($\frac{1}{100}$) of that resulting from downflow through the condenser in the conventional manner.

Further, by providing for raising the temperature of the plasma being dried during the last few hours of the drying process when its moisture content is relatively low it has now been found possible to additionally accelerate drying without deterioration of the product.

Other objects, improvements and advantages effected by the invention, as well as novel details thereof, will be apparent from the following description of preferred embodiments of method and means illustrative of the principles of the invention.

In the accompanying drawings of such illustrative embodiments,

Fig. 1 is a diagrammatic representation of novel apparatus for practicing the novel method of pre-freezing and drying of plasma and the like;

Figure 5:
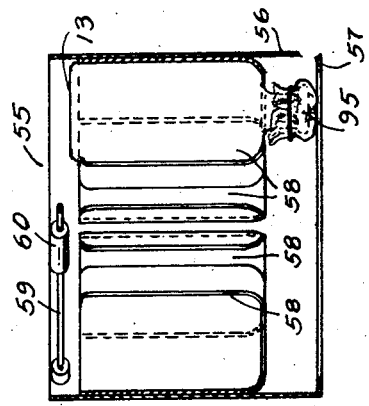
Fig. 5 is a sectional view thereof taken on the line 5—5 in Fig. 4, in the direction indicated by the arrows.

The successful operation of the present method and apparatus involves five important facts which previously have not been generally accepted or taken advantage of. Referring, as regards temperature limits, to those applicable to the representative and particularly delicate material, plasma:

1. The temperature of freezing of plasma has little or no practical effect, within the limits of minus 12 to minus 72 degrees C., on the quality of the final product.

2. The temperature at which water vapor condensation is carried out is not critical, within the limits of minus 30 degrees to minus 72 degrees C., provided that the rate of evaporation at any time during the operation is sufficiently rapid to avoid thawing of the frozen plasma. This is readily accomplished by using a condenser having sufficient surface capacity, and is economically effected by taking advantage of the upflow feature of the present invention, as hereinafter described.

3. The temperature of the condensing surface during the period of maximal sublimation may rise somewhat above minus 30 degrees C. without adversely affecting the process, provided that during the last few hours of the process the temperature is maintained between minus 30 degrees and minus 35 degrees C., or below.

4. The temperature of a water jacket for heating the plasma may be raised, during a portion of the process, to relatively high temperatures (80 degrees C.) without impairment of any of the essential qualities of the resulting product, but with considerable shortening of the time of drying as compared with methods and apparatus without such thermic control.

5. The temperature of the plasma itself may be raised to a relatively high level (75 degrees to 80 degrees C.) without deterioration, provided that the amount of moisture present is relatively low. This occurs in the last few hours of the process.

The demonstration of these facts has allowed the development of an efficient, practical method and apparatus which, in reasonably small installations, will enable drying of plasma in substantial quantity and at very low cost for use by groups of hospitals and industrial accident clinics, and with the armed forces at home and abroad. The use of very low temperatures (about minus 70 degrees C.), which has heretofore been emphasized for both pre-freezing and drying, has been one of the main factors in the almost prohibitive cost of other shelling and drying apparatus. Several types of inexpensive standard refrigerating machines now on the market are capable of producing constant temperatures of the order of minus 40 degrees C., and may be employed in the practice of the present invention at low cost.

Such a relatively small installation, herein selected to exemplify the invention, is capable of drying in from 14 to 20 hours, depending upon the thermic control, 24 lots of plasma, each containing 300 c. c. in a 400 c. c. container. Thus the capacity is considerably in excess of 7200 c. c. in 24 hours. The residual moisture of plasma so dried is consistently well below 1% to the weight of the remaining material assuring adequate preservation and rapid solution when the plasma is restored with solvent. The total cost of electric energy for shell freezing and drying with such installation is well under two cents per unit or less than $175 yearly. For the same operation if carbon dioxide ice were employed to attain temperatures in the vicinity of minus 70 degrees C., as in prior methods, the yearly cost of refrigeration alone would approximate $3000, or considerably more than the entire cost of installation and operation of apparatus in accordance with the present invention.

It is to be noted that the time of drying depends upon several factors. The most important are as follows:

1. The thickness of the shell of the frozen material, since a thinner shell dries much more rapidly than a thick one.

2. The amount of heat applied to the frozen material in the process of drying.

3. The diameter of the neck of the bottle containing the shelled material to be dried, this being a factor particularly where the vapor is drawn upwardly through the bottle neck.

4. The type of protection used to maintain sterility.

The apparatus described herein and shown in the drawings comprises a complete system for shell freezing and drying of plasma from the frozen state. It consists of four main parts identified in Fig. 1 of the drawing, namely, (1) a mechanical shelling apparatus or sheller; (2) a drying chamber with a water jacket; (3) a condenser with a mechanically refrigerated coil; and (4) the vacuum pump.

I. SHELLING APPARATUS, FIGS. 1 TO 3

In the form disclosed, the shelling device consists of an insulated metal pan 10 containing the cooling coils 11 and apparatus 12 for rotating the bottles 13 containing the plasma.

The cooling coil 11 may take any suitable form, being shown as a series of straight copper tubes. A plate type of cooler of suitable capacity, or any other form may be used without departure from the invention. A propeller 14 is provided to circulate the coolant which consists of cold alcohol in the form herein described. A storage reservoir 15 is provided for housing the alcohol when the sheller is not in use. On initiation of operation the alcohol is displaced from the storage chamber to the shelling pan 10 by any suitable means, as the pump 16 operated by motor 16a under control of the alcohol pump switch 16b in the form shown, the alcohol being brought to a predetermined level in the pan which will result in immersion of the bottles 13 to a depth of about 12 millimeters in the case of bottles of 400 c. c. capacity containing 300 c. c. of plasma. At the end of the shelling operation the alcohol is returned to the reservoir in any suitable manner, as by the valved gravity return line 17.

During the shelling operation the alcohol in the pan is cooled to a temperature of about minus 30 to minus 35 degrees C., and the complete shelling operation, hereinafter described can be conducted in approximatey an hour to an hour and a half, using the standard 400 c. c. plasma bottles with initial contents of 300 c. c. of plasma. The alcohol is easily maintained at the indicated temperature by passing of a refrigerant such as "Freon 12" through the cooling coil 11, and as indicated, this refrigerant may be supplied from the same refrigerant compressor employed for cooling the condenser. To this end a valved inlet line 11a is provided and an outlet line 11b which may be provided with the valve 11c in the event it is desired to completely isolate the cooling coil 11 from the refrigerating system. Ordinarily the valve 11c will remain open during standby of the apparatus.

Figures 3, 7:
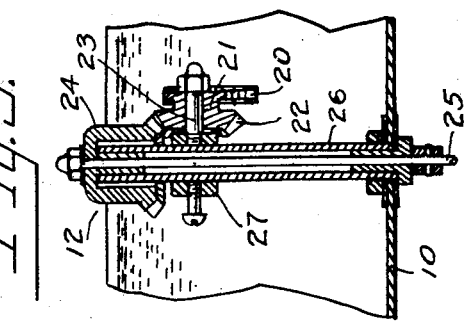
Fig. 3 is an enlarged detail of a portion of the drive mechanism in Fig. 1, taken on the line 3—3 in Fig. 1, in the direction of the arrows.
Fig. 7 is an enlarged sectional detail of the self-sealing drain employed in the novel condenser in Fig. 1.
Figure 2:
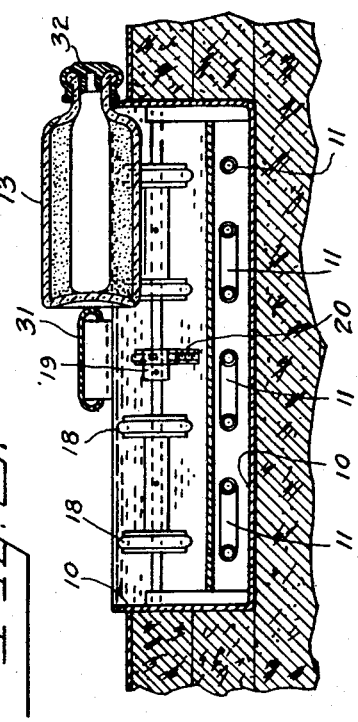
Fig. 2 is an enlarged sectional view of the pre-freezing or shelling arrangement taken on line 2—2 in Fig. 1, in the direction indicated by the arrows.

The rotating device of the sheller may take any suitable form and in the form shown in Figs. 1 to 3 comprises a series of rotatable supports 18 in the form of rubber tired wheels carried on transverse shafts provided with sprockets 19 connected by a chain 20 to a drive sprocket 21 (Fig. 3) which is rotatable with a driven gear 22 on a stub shaft 23, which driven gear meshes with a driving gear 24 carried by the driving shaft 25. In the form shown the driving elements 21 to 25 are mounted at one end of the sheller (Fig. 1) and for convenience extend through the bottom of the pan 10. For this purpose the pan is provided with a riser tube 26 (Fig. 3) which extends above the level of the alcohol in pan 10 and the driving gear 24 is of cup form while the shaft 25 passes through the riser tube. With this arrangement the stub shaft 23 is conveniently carried by an adjustable collar 27 (Fig. 3) supported on the riser 26.

The driving mechanism is arranged to rotate the bottles 13 at approximately one-half revolution per minute, this being accomplished in the form shown by the use of suitable reduction gearing 28 (Fig. 1) connecting the shaft 25 with a driving motor 29 under the control of a shelling switch 30. As shown, the bases of the bottles 13 when positioned on the rollers 18 abut a guide rail 31 (Fig. 2) and are held at such an elevation that their necks, suitably sealed by rubber stoppers 32, overhang the edges of the pan 10 with free clearance. The impeller 14 for circulating the cold alcohol is, like the gear 24, of cup form and driven by a shaft 33 (Fig. 1) extending through a riser tube 34 similar to the elements 25 and 26 in Fig. 3. The impeller blades are preferably located in an upflow opening 35a in a circulation guide plate 35 having the form of a false bottom overlying the cooling element 11, and provided at the opposite end of pan 10 with a downflow opening 35b. By this arrangement the alcohol may be rapidly circulated past the coil 11 and bottles 13 so that its temperature in contact with the several bottles remains substantially fixed at that selected for the shelling operation. The impeller drive shaft 33 is suitably driven as by a motor 36 under control of a stirrer switch 37.

II. THE DRYING CHAMBER, FIGS. 1, 5 AND 6

The drying chamber in the illustrative embodiment comprises a heavy brass cylinder 40 approximately nine inches in diameter and thirty-three inches high, surrounded by a water jacket 41. It is closed at the top by a heavy steel lid 42 which rests on a rubber gasket 43 and is tightened down by threaded lugs and wing nuts 44. The opening for connection with the condenser is located at the bottom of the drying chamber and preferably centrally thereof to enable downflow withdrawal of the water vapor in accordance with this invention. This opening in the illustrative embodiment may have a diameter of approximately two inches and is connected with the condenser by a short copper pipe 45 of similar diameter.

The water jacket 41 is formed between the drying chamber 40 and a metal outer shell 46 spaced approximately three inches from the drying chamber wall. This water jacket is provided with an electric heating element 47 fitted to the bottom and capable of maintaining the water in the jacket at any desired temperature up to 80 degrees C. The heater 47 is controlled by a thermostat and relay 48 which may be adjusted by setting the thermostat control knob 49, the circuit being under control of the water jacket heater switch 50. Suitable piping connections 51 and 52 are provided for supplying hot or cold water to the water jacket which is provided with an outflow connection 53.

Figure 4:
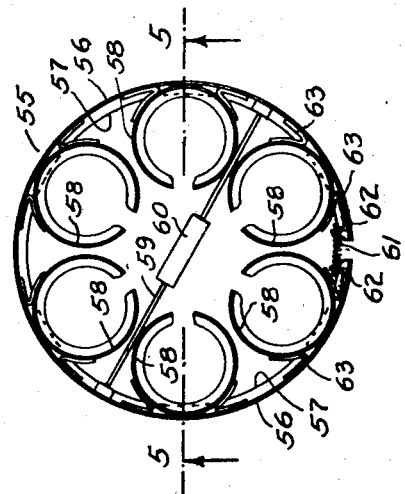
Fig. 4 is a plan view of a preferred form of heat conductive basket which may be employed in drying the frozen material in the final containers.

The drying chamber 40 in the form shown is fitted with four copper baskets 55 (Fig. 1) preferably of the form shown in Figs. 4 and 5. This form of basket comprises an outer split cylinder 56 of fairly heavy, say 24-ounce copper, adapted to fit tightly against the inner wall of the chamber 40. The lower border of the cylinder, if desired, may be turned inwardly as at 57 (Fig. 5) thus strengthening the cylinder. This large cylinder 56 contains a series of six smaller split copper cylinders 58, in the preferred form slightly in-turned at their bottom edges and of the proper diameter to grip the plasma bottles tightly with firm engagement throughout their side walls and neck shoulders as best shown in Fig. 5. The basket is completed by a transverse bar 59 provided with an insulating handgrip 60, and by spring expanders 61 (Fig. 4) embraced between pin-carrying angles 62 secured to the larger cylinder 56 adjacent the top and bottom ends of its split edges, which maintain proper expansion of the outer cylinder, and by a series of copper wedges 63 (Fig. 4) which assist in increasing heat conduction as well as in maintaining firm contact of the shells 58 with the walls of bottles 13.

As shown in Fig. 5 this preferred form of basket is formed to hold the plasma bottles, in which the shells are frozen, in inverted position to facilitate withdrawal of the water vapor from the bottles in a downward direction for added efficiency.

Figure 6:
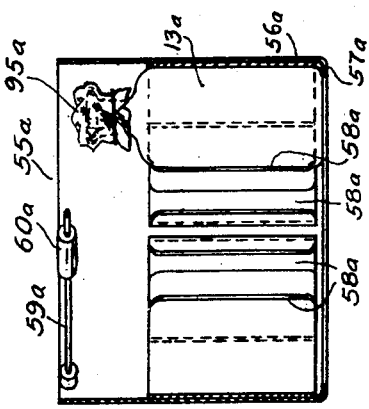
Fig. 6 is a similar sectional view of a modified form of basket.

If it is not desired to obtain this advantage the baskets may take the form shown in Fig. 6 in which the several parts bear reference numerals corresponding to those in Fig. 5 differentiated by the subscript "a." In this arrangement the lower edge of the bottle holding cylinders 58a is straight and not inturned and the inturned flange 57a of the larger cylinder 56a serves not only to strengthen the cylinder but also to hold the plasma bottles in place. In both forms, as shown, the outer cylinder 56 (56a) is preferably of such a height that the handle 60a is housed below its upper edge.

Suitable means is provided for determining when the drying of the plasma has been completed. In the form shown (Fig. 1) this means comprises a recording thermometer 65 having its bulb 65a fixed to the bottom of the drying chamber in a position to lie in direct contact with two of the copper cylinders 58 (Fig. 4) of the bottom basket 55, and a dial thermometer 66 arranged to show the temperature of the water in the water jacket. By this arrangement the reading of the recording thermometer 65 is affected by the temperature of the bottles of plasma in the copper cylinders, the temperature gradient being very small when the cylinders approach the temperature of the water jacket. When the temperature shown by the recording thermometer 65 has been for two hours or more within two degrees of the temperature in the water jacket the drying has been completed.

One of the difficulties in the drying of plasma from the frozen state is the proper application of heat to the plasma to counteract the cooling effect of rapid evaporation. If no heat is applied the drying process requires several days. If properly controlled heat is applied the time of drying is reduced to less than 24 hours, as above indicated. Heat from the water bath around the water chamber is conducted to the plasma very satisfactorily by means of the copper baskets above described.

III. CONDENSER, FIGS. 1 AND 7

In the construction of the condenser there are two essential features: (1) The large water vapor inlet is located in the lowest part of the condensing chamber. (2) The refrigerated coils are so arranged that by means of properly placed shields the water vapor is made to travel in an upward direction for a considerable distance and come in contact with a large condensing surface in such trip. The last portion of the coil with which the vapor comes in contact is preferably the coldest. This arrangement assures condensation of all of the water vapor and prevents any water from mixing with the oil of the vacuum pump. In the form shown in Fig. 1 the water vapor leaving the drier by way of the bottom outlet is conducted by the connecting pipe 45 to the bottom inlet 70 of the condenser. A valve 71 is provided in the pipe 45 for the purpose of isolating the drier from the condenser when it is desired to add or remove bottles of shelled plasma from the drier without shutting down the condenser. A vacuum breaker valve 71a for admitting air to the drier through an air filter 71b is provided to facilitate this operation. A drain valve 72 is likewise provided to enable drainage of condensate on shutdown of the condenser. The condenser proper comprises an outer casing 73 which may be provided with an insulating jacket, a portion of which is indicated at 74, which houses the condenser coil sections 75, 76 and 77, the guide shield 78 and the outlet for non-condensables 79. The refrigerant supplied from the refrigerant compressor 80, controlled by switch 80a, is preferably supplied to the last coil section 77 under control of the condenser cooling coil valve 81 and is then passed through the condenser coil sections 76 and 75 to the refrigerant return line which may be controlled by a valve 81a to enable isolation of the coils from the refrigerant source. By this arrangement a counterflow of refrigerant and water vapors is provided and efficiency of condensation aided. The fact that the water vapor enters the condenser 73 through the opening 70 in its bottom and is passed in an upward direction throughout its travel over coils 75, 76 and 77 is of great importance, because this allows slower diffusion of the water vapor and allows maximal condensation on the first set of coils (75) with which the vapor comes in contact. Under ordinary conditions the greatest portion of the vapor is condensed on coil 75. Some vapor which escapes this coil reaches coil 76. Here the vapor travels through a rather narrow space between the wall of the condenser and the cylindrical copper shield 78 placed inside of coil 76. If a trace of water vapor escapes coil 76 it must travel through the narrow funnel-like drop tube 78a to reach the third and coldest coil section 77 which is enclosed in the copper box 78. The vacuum pump is connected to the condenser by means of the conduit 79 opening into the top of the box 78.

With this arrangement the great bulk of the water vapor is condensed on coil 75, a smaller amount on coil 76 and only a trace on coil 77. No water escapes to the vacuum pump. This has been determined by placing a copper U-tube 5 cm. in diameter in the vacuum line 79 during runs of the installation. The U-tube was immersed in a bath of carbon dioxide ice and alcohol maintaining a temperature of minus 70 degrees C. to minus 72 degrees C. At the end of the runs no condensed water vapor was found in the U-tube. The arrangement described provides an efficient condenser, occupying little if any more space than the drier itself and having the condenser exhaust outlet 79 at a level adjacent the level of the top of the drier, as shown in Figure 1.

The condenser chamber 73 is made of copper sufficiently strong to withstand a high vacuum. An adequate condensing surface may be provided with a total of approximately 44 feet of copper coil of $5/8$ inch internal diameter. A dial thermometer 82 shows the temperature of the refrigerant entering the condenser. This greatly assists in checking proper operation of the refrigerating compressor. An electric heater 83 is provided in the condenser to melt the ice from the coils rapidly at the end of each drying run. The melted ice is then drained from the condenser through the opening 70 in the bottom and disposed of by way of valve 72.

The copper shield or box 78 is so constructed that the ice formed on coil 77 will drain out once it is melted. This is preferably accomplished by means of a self-sealing valve surrounding the lead-in line as it enters the box 78. As shown in Fig. 7 this valve consists of a short length of copper tube 85 insulated from the rest of the box 78 as by packing 86 and of a diameter approximately 2 mm. larger than the outside diameter of the refrigerated coil 77a passing through it. When the drying process is initiated, water vapor soon freezes between coil 77a and the sleeve 85 and so seals the opening. When the ice is melted the valve thus provided is open and allows water from coil 77 to drain from the condenser.

For the size installation selected as illustrative of the invention, a 4-cylinder three-quarter horse power compressor with dehydrator and oil separator, such as the "Servel F–12" is very satisfactory for cooling both the coils 11 in the shelling pan 10 and the coils 75, 76, 77 in the condenser. The shelling pan and condenser coils may be cooled simultaneously or individually. The refrigerant gas should be pumped out of the coils before heat is applied in the condenser to melt the ice at the end of each run. Such a compressor will maintain the coils in the condenser at a temperature of from minus 35 to minus 40 degrees C. without a load and from minus 30 to minus 35 degrees C. while the drying is being accomplished. Occasionally during the period of maximal condensation the temperature may be a little higher. The operation of the heater 83 in the form shown is controlled by a manually operated condenser heater switch 84.

IV. VACUUM PUMP AND GAUGE

For the installation selected as illustrative the motor driven vacuum pump 89 desirably has a capacity sufficient to evacuate the system to a pressure of less than 2500 microns in ten minutes and 500 microns in less than fifteen minutes with the temperature of the condensing coils 75, 76 and 77 at minus 30 to minus 40 degrees C.

The vacuum gauge may be of any suitable type, for example, a Pirani type gauge, graduated from 2500 microns to 0 micron, or a MacLeod type mercury gauge, being satisfactory. It is desirable to provide in addition a rough dial type vacuum gauge reading from atmospheric pressure to zero to enable the operator at a glance to determine the initial rate of evacuation of the system when a drying run is being started. This enables him to ascertain in the first minute or so that all outlets have been properly closed. In addition to the manual vacuum pump switch 90 controlling operation of the vacuum pump 89 a thermostatic switch 91 is provided which prevents commencement of evacuation until the temperature of the coils 75, 76 and 77 has been suitably reduced, e. g., until the thermometer on the condensing coil registers approximately minus 35 degrees C. The entire apparatus may be compactly assembled in a single cabinet and all switches, valves and recording dials and instruments may be placed on a single panel thereon. The drier and the condenser are arranged in side-by-side relation in the cabinet to provide for their connection by a short length of the pipe 45.

V. MECHANICAL SHELL FREEZING AT MINUS 20 DEGREES TO MINUS 35 DEGREES C.

The present research has shown that the low temperatures in the neighborhood of minus 60 to minus 70 degrees C., heretofore deemed necessary for rapid pre-freezing of plasma, do not offer any practical advantage. The initial research showed, however, that shell freezing at temperatures of minus 40 degrees C. and higher could not be satisfactorily conducted since the plasma in the rotating container became supercooled at minus 6 degrees C. to minus 12 degrees C. and would then "snap" freeze, with slushing and formation of an irregular shell and large lumps which greatly interfered with the subsequent drying.

The present method was developed to avoid these difficulties and resides in producing a relatively rapid cooling of the plasma from room temperature to approximately the freezing temperature, say 10 degrees C., followed by local freezing in contact with the inner surface of the bottle to avoid supercooling of the entire mass and slushing following snap freezing. The new principle rests on the discovery that even if the entire body of liquid is supercooled, if provision is made for local snap freezing at one point on the wall of the container without disturbance of the liquid contents, the local ice formation serves to immediately raise the temperature of the remaining liquid phase to a nonsupercooled level and enables it to be frozen in a uniform shell elsewhere of somewhat more gross crystalline structure, which it has been found does not impair the quality of the product.

This is accomplished by the following method: The plasma bottle 13 (Figs. 1 and 2) which may be of 400 c. c. capacity containing 300 c. c. of plasma is rotated slowly, say one-half to one revolution per minute, with approximately 12 mm. immersion in alcohol cooled to a temperature of approximately minus 30 to minus 35 degrees C. for a period sufficiently long to bring the temperature of the plasma down to about plus 10 degrees C. This cooling may be accomplished in from 3 to 10 minutes, depending on the temperature of the plasma and the temperature of the alcohol. With plasma at plus 25 degrees C. initially, and alcohol at minus 30 degrees C., about 10 minutes are required. After this period of cooling the rotation of the bottles is stopped long enough to cause the lower portion of the plasma to snap freeze on the cooled wall of the bottle to a depth of about 3 to 4 mm. This requires 2 to 4 minutes and the phenomenon is, as a rule, clearly visible. It is important to remember that during this period of time the bottle of plasma must not be disturbed and that the depth of immersion of the bottle in the cooled alcohol should be only approximately 10 to 12 m. m. Occasionally, and for no apparent reason, one bottle may take considerably longer to show the initial local snap freezing. It must not be disturbed until the snap freezing has occurred. It is desirable to obtain a temperature of alcohol of minus 35 degrees C. or a little lower before placing the bottles in the shelling pan.

When the local snap freezing has occurred in all the bottles the rotating motion is resumed and shell freezing occurs at a regular rate and very evenly. With a temperature varying between minus 35 degrees C. and minus 25 degrees C. it requires from an hour to an hour and a half for complete shell freezing of 300 c. c. of plasma in the standard 400 c. c. bottle. The quality of the material thus frozen is practically identical with that obtained from shell freezing at minus 70 degrees C. The material thus frozen is, however, readily distinguished from the other as it shows a longitudinal portion of microcrystalline, homogeneous aspect, lighter in color, and about 4 to 5 cm. wide and 3 to 4 mm. thick where the initial snap freezing occurred. The remaining portion shows a macrocrystalline structure, and this aspect is clearly retained after drying from the frozen state.

When the plasma is shelled the bottles are placed in a storage cabinet at minus 20 degrees C. to minus 30 degrees C. to cool. It takes about four hours for the frozen material to cool from about 0 degrees C. to minus 20 degrees C. The plasma thus shelled can remain in cold storage for an indefinite period of time and may constitute a frozen plasma bank.

*Drying of shelled plasma*

In further treating the plasma by drying, about an hour before initiation of the process the copper baskets 55 are placed in the low temperature cabinet to cool. At the same time the bottles 13 of shell-frozen plasma are removed one by one from the storage cabinet, and under aseptic precautions, the rubber stoppers 32 (Fig. 2) are rolled off and replaced by large sterile gauze cuffs 95 (Figs. 5 and 6) formed of two layers of 40-mesh gauze and secured by rubber bands as shown. The bottles 13 are then placed in the copper baskets 55 and allowed to cool for about one-half hour at minus 20 to minus 30 degrees C.

Before each drying run the apparatus should be tested to be sure it will produce a satisfactory vacuum and low temperature. For this purpose the drying chamber 40, 42 and the inlet valve 96 are closed and the refrigerant compressor is started and allowed to run until the thermometer 82 on the condensing coil 77a registers minus 30 degrees C. or less. The vacuum pump 89 may then be started and a vacuum of 500 microns or less should be obtained in something under 15 minutes in the installation selected for purpose of illustration. If this is accomplished, the vacuum pump is shut down, the vacuum is released and the drying chamber opened. The copper baskets 55 containing the bottles of shell-frozen plasma 13 are then rapidly placed in the chamber 40, the lid 42 is closed and the vacuum pump 89 started. This operation can readily be accomplished in about two minutes. A pressure of 500 microns or less should be attained in something under 15 minutes to avoid danger of thawing of the frozen plasma. The water in the water jacket 46 of the drying chamber at this stage should be cool, not over 25 degrees C. The operation is allowed to proceed for one hour. The water jacket heater switch 50 is then turned on with the thermostatic regulator 39 set at plus 50 degrees C. Drying is then allowed to proceed until the recording thermometer 65 recording the temperature of the plasma has been for two hours or more within 2 degrees of the temperature of the water in the water jacket as indicated by the dial thermometer 66. The vacuum pump is then stopped and filtered air is allowed to enter slowly through the vacuum release valve 96. This air passes through the condenser 73 before it enters the drying chamber 40 and thus is dried. The opening of the inlet valve 96 is covered with 40 to 50 layers of gauze to effect a good filtration of air, as indicated at 97, sufficient per se to minimize danger of contamination. The air should be allowed to enter slowly, taking about 5 minutes for the entire vacuum breaking operation. The copper baskets 55 are removed one at a time and the bottles promptly stoppered. The bottles are then evacuated and the rubber stoppers 32 are covered with gel caps. This method of closure is sufficient for preservation up to three years. If the preservation is to be for longer periods of time, the dried material is preferably vacuum sealed in tin cans.

The time of drying with a continuous temperature of 50 degrees C. in the water jacket is less than 18 hours. When it is desired to reduce the drying time the temperature of the water jacket may be increased up to 80 degrees C. for a period of time.

The dried plasma obtained with the new apparatus and method is a light, porous material with a distinct crystalline structure and a volume slightly less than that occupied by the frozen plasma. It may be readily reduced to a fluffy powder by shaking, in which case it occupies about one-third of the original volume. The powder thus obtained is readily transferred to another receptacle for purpose of residual moisture determination or of combining the content of two or more bottles. The color of the dried plasma is light amber, when the original liquid plasma has a hemoglobin content of less than 5 mg. It is very soluble in water. When solvent is introduced by vacuum suction, dried plasma containing 17.5 gm. of plasma proteins (the equivalent of about 300 c. c. of fresh citrated plasma) dissolves entirely in 250 c. c. of distilled water or 0.1 percent citric acid solution in less than one minute, including the time consumed by the introduction of the solvent.

The resulting fluid is stable at room temperature for at least several days; it has a maximal content of complement, and a maximal content of prothrombin if regenerated with 0.1 percent citric acid solution. The use intravenously of properly prepared material causes no untoward reactions, save an occasional (less than 1%) urticarial reaction.

The size apparatus herein described as illustrative is considered best for the purpose intended, namely for large hospitals to dry plasma for their own use and for neighboring institutions. Both smaller (1800 c. c. daily capacity) and larger (21,600 c. c. daily capacity) units have been successfully operated. For larger units it is desirable to institute automatic temperature control, for minimum drying time with the least technical supervision.

In addition to human plasma, serum, guinea pig complement, bacterial cultures, milk, many fruit juices, cultural media, and even meats and other products have been dried by the method and apparatus herein described with excellent preservation of all essential properties including flavor and vitamin content.

It will be apparent from the foregoing description that the invention is not limited to the particular illustrative embodiments disclosed to illustrate the same.

What is claimed is:

1. In the art of preserving plasma and like biological products, a process which consists in precooling the plasma to approximately its freezing point in a bottle-like container, further cooling and snap freezing a portion of the plasma to the wall of the container while maintaining the container on its side and the plasma quiescent therein, thereafter rotating the container on its side about a horizontal axis and further cooling the same to cause freezing of the plasma about the inner wall of the container in a shell of substantially uniform thickness, arranging the container of shelled plasma neck down in a zone of high vacuum and, while maintaining the plasma in frozen state therein, withdrawing effluent vapors from the plasma and from said zone in a downward direction in which the withdrawal of vapor is facilitated by the action of gravity, passing the withdrawn vapor to and thence upwardly through a condenser in said zone of high vacuum so that the contact of the vapor with the condensing surfaces is prolonged by the action of gravity, while maintaining the condensing surfaces at a temperature of approximately minus 30 degrees C. to minus 40 degrees C., and conducting heat to the plasma during the drying operation at a controlled rate expediting drying thereof without thawing of the frozen and drying mass, until the plasma is dried in said container.

2. In the art of preserving plasma and like biological products, a process which consists in precooling the plasma to approximately its freezing point in a generally cylindrical container having a neck-opening at its end, further cooling and snap freezing a portion of the plasma to the wall of the container while maintaining the plasma quiescent, and thereafter rotating the container, on its side, about its cylindrical axis, and further cooling the same to cause shell freezing of the plasma about the inner wall of the container as a cylindrical lining of substantially uniform thickness, for the purpose described.

3. In the mechanical shell freezing of biological materials in a cylindrical container, the improvement which comprises inducing snap freezing of a portion of the material to the side of the container with the material in a quiescent state, and thereafter inducing progressive freezing of the material as a shell around the inner wall of the container while slowly rotating the container, on its side, about its cylindrical axis.

4. In a process of the character described, the steps comprising arranging frozen biological material in a drying zone of high vacuum, withdrawing vapors through the base of said drying zone to provide in said zone a gravity downflow of vapors from said material to said zone base, passing said withdrawn vapors through the base of a refrigerated zone of high vacuum and then upwardly therein to freeze out condensables in the vapors, and exhausting non-condensable gases from said refrigerated zone at a level adjacent but not substantially below the highest level at which vapors are evolved from said material in said drying zone.

5. In the art of high vacuum, low temperature drying of plasma and similar biological materials of high water content, the method which comprises arranging the shell-frozen biological material in vertical position in a zone of high vacuum, withdrawing effluent vapors from the biological material by downward flow therein and in said zone, withdrawing said vapors from said zone in a downward flow through the base thereof, conducting the withdrawn vapors to a low temperature high vacuum refrigerated zone, then passing said vapors into and through said refrigerated zone in upward flow for freezing out condensable constituents of the vapors, and exhausting non-condensable gases from said refrigerated zone at a level not substantially below the highest level adjacent but at which vapors are evolved from said material in said drying zone.

6. Apparatus of the character described, comprising a pre-freezing unit adapted to snap freeze to the side of a cylindrical container a part of a quiescent body of biological material therein, said unit comprising means for thereafter rotating the cylindrical container about its axis with said axis positioned horizontally to complete the freezing of the biological material as a shell therein; a heat conductive high vacuum drying chamber, and heat conductive baskets for embracing said cylindrical containers and snugly fitting within said drying chamber, for conducting heat to said containers from the wall of said chamber; means under control of the operator for heating the wall of said chamber to accelerate evolution of vapor from said biological material, said containers having axial outlets for the vapors evolved from the frozen shell of biologicals therein, said drying chamber having an outlet for effluent vapors at its bottom; a condenser having a vapor inlet at its bottom, a conduit connecting said bottom outlet with said bottom inlet, said condenser having an outlet for non-condensables and being arranged to cause passage of the effluent from said bottom inlet to said non-condensables outlet in counter-gravity flow, means for refrigerating said freezing unit and said condenser, and means for creating a vacuum in said condenser, conduit and drying chamber.

7. A combination according to claim 6, in which said heat conductive baskets are arranged to support said containers of pre-frozen shelled material with their axial outlets downwardly directed, for the purpose described.

8. As an element for use in apparatus for drying shell-frozen biologicals and the like in a high vacuum drying chamber having a heat conductive wall, a heat conductive basket comprising an outer split shell of metal open at top and bottom and formed to closely contact the heat conductive wall of the drying chamber; a handle located within, flush with and secured to the topmost edge of said shell; inner split cylinders of metal arranged within and secured to said shell and in heat conductive contact therewith; each of said cylinders being formed to embrace closely the side walls of a standard bottle of shell-frozen biological in heat conductive relation thereto with the open bottle neck directed downwardly and positioned between the lowermost edge of the cylinder and the lowermost edge of said shell; each of said cylinders having its lowermost edge in-turned to closely engage and support the bottle shoulder.

9. In the art of preserving plasma and like biological materials, the process comprising the steps of cooling the plasma in cylindrical containers to snap freeze in each container a portion of the plasma therein to the wall of the container with the plasma quiescent therein, rotating said containers on their sides and about their cylindrical axes while cooling the same to continue the freezing of the plasma and form about the inner wall of each container a substantially cylindrical shell of frozen plasma of substantially uniform thickness, arranging said containers of shelled plasma in inverted position, with the lower ends open, in a drying zone of high vacuum, withdrawing effluent vapors from the base of said zone to provide within the hollow interior of each of said plasma shell and throughout said zone a downflow of said vapors with the aid of gravity, passing said withdrawn vapors to the base of a second zone of high vacuum and then upwardly therein, said second zone having therein condensing surfaces immersed in said upflow of vapors and maintained at a temperature on the order of minus 30 degrees C. to minus 40 degrees C. to freeze out condensables in the upflowing effluent vapors, conducting heat through the walls of said drying zone and the containers therein and to the plasma at a controlled rate to accelerate the plasma drying while retained in frozen state, and removing said containers from said drying zone after the plasma therein is dried.

10. A process for shell freezing of biological material in a cylindrical container, said process comprising snap freezing a portion of the biological material to a wall of the container with the material in a quiescent state, then rotating the container about its cylindrical axis, and simultaneously with said rotation inducing progressive freezing of the material as a shell around the inner side wall of the container, the rotation and freezing continuing until the material forms a cylindrical lining of substantially uniform thickness.

11. High vacuum apparatus of the character described comprising a high vacuum subliming chamber for drying therein frozen material and adapted to provide a gravity downflow of evolved vapors from said material to the base of said chamber, a high vacuum condensing chamber connected to said subliming chamber to withdraw said vapors from said subliming chamber adjacent said base and to pass the withdrawn vapors into said condensing chamber adjacent the base thereof; and high vacuum means adapted to provide an upflow of the vapor in said condensing chamber and to withdraw non-condensable gases from said condensing chamber; said means communicating with the interior of said condensing chamber at a level adjacent but not substantially below the gravity vapor level of said two chambers.

12. Apparatus as recited in claim 11, wherein refrigerated means are arranged within the condensing chamber, in the upflow of vapors and gases, and between the condensing chamber base and the gas outlet thereof; said refrigerated means providing vapor condensation at progressively decreasing low temperature in the upflow travel of said vapors and gases in said condensing chamber.

13. High vacuum apparatus of the character described comprising a high vacuum subliming chamber for drying therein frozen biological material of high water content, means for conducting heat to said material to promote the evolution of vapors while maintaining the material in the frozen state, a high vacuum chamber for condensing the condensable constituents of said vapors, said chambers being so relatively arranged that the highest level at which vapors are evolved in said subliming chamber is below the uppermost level of said condensing chamber; means connecting the base of said subliming chamber with the base of said condensing chamber to provide a gravity downflow of the vapors in said subliming chamber, to withdraw such vapors through the base of said subliming chamber, and to pass the withdrawn vapors to and upwardly through the base of said condensing chamber, an outlet for non-condensable gases communicating with the interior of said condensing chamber at a level adjacent but not substantially below said highest level, a high vacuum pump connected to said outlet, and refrigerated means for condensing out condensable constituents of said vapors as they flow upwardly in said condenser and from the base thereof to said outlet.

MAX M. STRUMIA.

REFERENCES CITED

The following references are of record in the file of this patent:

UNITED STATES PATENTS

| Number | Name | Date |
|---|---|---|
| Re. 20,969 | Reichel et al. | Jan. 3, 1939 |
| 864,978 | Morel | Sept. 3, 1907 |
| 1,165,306 | Allen et al. | Dec. 21, 1915 |
| 1,189,711 | Lummus | July 4, 1916 |
| 1,222,801 | Rosenbaum | Apr. 17, 1917 |
| 1,512,909 | Dohr | Oct. 28, 1924 |
| 1,949,616 | Messer | Mar. 6, 1934 |
| 1,970,956 | Elser | Aug. 21, 1934 |
| 2,163,996 | Flosdorf | June 27, 1939 |
| 2,199,815 | Flosdorf | May 7, 1940 |
| 2,252,739 | Stoever | Aug. 19, 1941 |
| 2,292,447 | Irwin | Aug. 11, 1942 |
| 2,302,253 | Reichel et al. | Nov. 17, 1942 |
| 2,345,548 | Flosdorf et al. | Mar. 28, 1944 |
| 2,353,986 | Barr | July 18, 1944 |
| 2,356,068 | Larsson | Aug. 15, 1944 |

FOREIGN PATENTS

| Number | Country | Date |
|---|---|---|
| 784,430 | France | Apr. 29, 1935 |
| 840,092 | France | Jan. 11, 1939 |

OTHER REFERENCES

Science, June 19, 1942, page 633.

"The Preparation and Preservation of Human Plasma," Strumia et al., pages 480–496 of American Journal of Clinical Pathology, vol. II, June 1941.

"The Preparation and Preservation of Human Plasma," by Strumia, McGraw and Reichel, American Journal of Clinical Pathology, pages 388–401, May 1941.

"A Method and Apparatus for Shell Freezing and Rapid Drying of Blood Plasma and Other Products from the Frozen State by Low Temperature Water Vapor Condensation of Vacuo," Strumia and McGraw, The Journal of Clinical Medicine, June 1943.